United States Patent [19]
Linebarger et al.

[11] Patent Number: 6,068,485
[45] Date of Patent: May 30, 2000

[54] SYSTEM FOR SYNTHESIZING SPOKEN MESSAGES

[75] Inventors: Marcia C. Linebarger, Elkins Park; John F. Romania, Phoenixville, both of Pa.

[73] Assignee: Unisys Corporation, Blue Bell, Pa.

[21] Appl. No.: 09/071,472

[22] Filed: May 1, 1998

[51] Int. Cl.[7] .............. G06K 9/00; G09B 19/04; G09B 5/00; G10L 11/00
[52] U.S. Cl. .............. 434/116; 434/169; 434/185; 434/308; 704/271
[58] Field of Search .............. 434/112, 116, 434/156, 167, 169, 176, 185, 307 R, 308, 309, 319; 704/270, 271

[56] References Cited

U.S. PATENT DOCUMENTS

| | | | |
|---|---|---|---|
| 4,465,465 | 8/1984 | Nelson | 434/112 |
| 4,785,420 | 11/1988 | Little | 704/271 |
| 5,169,342 | 12/1992 | Steele et al. | 434/112 |
| 5,299,125 | 3/1994 | Baker et al. | 704/9 |

*Primary Examiner*—Robert A. Hafer
*Assistant Examiner*—John Edmund Rovnak
*Attorney, Agent, or Firm*—Rocco L. Adornato; Mark T. Starr; Steven B. Samuels

[57] ABSTRACT

A computer-operated system for assisting aphasics in communication includes user-controlled means for storing data representing the user's vocalizations during a time interval, means for associating the data stored in each of a plurality of such intervals with an icon, means for ordering a plurality of such icons in a group representing a speech message, and means for generating an audio output from the stored data represented by the icons in the group so as to provide a speech message.

19 Claims, 2 Drawing Sheets

SYSTEM FOR SYNTHESIZING SPOKEN MESSAGES

STATEMENT REGARDING FEDERALLY FUNDED RESEARCH OR DEVELOPMENT

This invention was made with government support under grant number R01-DC-02377 awarded by the PHS. The government has certain rights in this invention.

BACKGROUND THE OF INVENTION

This invention relates to generation of speech. More particularly, this invention relates to a computer-based system that can be used by a person having aphasia, or another condition which impairs normal human speech functions, in order to assemble and deliver a speech message.

Aphasia is a language disorder caused by stroke or other injury to the brain; some form of aphasia afflicts over two million Americans. Aphasia interferes with the ability to select words and assemble the selected words in accordance with syntax rules to form sentences communicating an intended meaning. Computer technology has been employed to assist in the mechanics of communicating with aphasic patients. For instance U.S. Pat. No. 5,169,342 to Steele et al. describes a graphically based communication system that is provided to the user with a stored set of words and associated icons that have been selected by the system provider as the universe of words available for use during a communication session. The icons are selected to visually represent the meaning of the words with which they are associated, for instance an image of a cigarette with a diagonal line through it to represent the word "nonsmoking". The system includes a phrase window where icons are displayed in an ordered manner to represent a sentence composed of the words they represent, and an access window where icons representing candidate words for possible inclusion in a sentence may be displayed. The system displays in the phrase window the icons representing a sentence which is selected, by means which are not apparent, as appropriate for the communication session. An aphasic patient uses the system to communicate by manipulating a mouse to replace icons in the displayed phrase with other icons representing the words the patient intends to communicate. The candidate replacement words for a displayed word are selected by the system as being paradigmatic alternatives for the displayed word in the sentence syntax. Thus the use of the system entails an iterative process including the comprehension of the syntax of the sentence represented by the displayed icons, identification of a sentence component that is at variance with the user's intended meaning and therefore is to be replaced, exploration of the set of paradigmatic alternatives provided by the system for the word to be replaced, selection of a replacement word, and repetition of these steps until the user is satisfied with the sentence as representing an intended meaning. This system has a number of drawbacks. By relying on a set of stored words, a tradeoff is created between search time and accuracy of meaning; a small vocabulary is more quickly searched but may lack words to convey a particular meaning, and a vocabulary large enough for communication of a wide range of meanings may require so much time to search for the right word as to be impractical for communication. This is particularly problematic since aphasics generally have difficulty with the linguistic and mechanical steps involved in constructing a sentence using the system. Moreover, at each step of the process the user must glean the meaning of a word from its icon. Icons are frequently enigmatic, and it may be quite difficult to ascertain the meaning of a vocabulary word from its icon and time-consuming to access further data that explains the meaning of an icon. This is particularly problematic with functional words, which are difficult to represent by an informing icon but which are often critical to the meaning of a sentence. The prior art systems for assisting aphasics in sentence construction are cumbersome, slow, and difficult to use.

SUMMARY OF THE INVENTION

It is therefore a general object of the invention to provide a system for assisting aphasic patients in communication that avoids the aforementioned drawbacks of the prior art, and to provide a communication system that is simple, easy to use, and enables an aphasic patient to quickly construct sentences that effectively convey their intended meanings. In accordance with the invention, a computer-operated system is provided that includes user-controlled means for storing data representing the user's vocalizations during a time interval, means for associating the data stored in each of a plurality of such intervals with an icon, means for ordering a plurality of such icons in a group representing a speech message, and means for generating an audio output from the stored data represented by the icons in the group so as to provide a speech message. These and other objects and features of the invention will be understood with reference to the following specification and claims, and the drawings.

DETAILED DESCRIPTION

Figure 1:
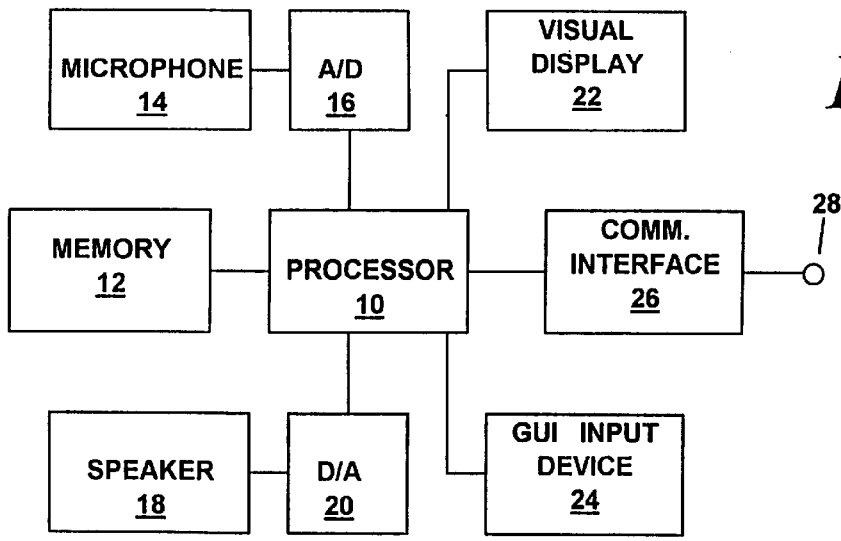
FIG. 1 is a block diagram illustrating the functional elements of a preferred system in accordance with the present invention.

The present invention is preferably implemented as a computer system including audio input and output and a visual display, the computer system operating in accordance with stored instructions to effect the method of the present invention and provide a spoken message generating system in accordance with the present invention. FIG. 1 is a block diagram representing at a very general level the functional elements of a computer system in accordance with the present invention. The system includes a processor 10 operating under control of software stored in memory 12. A microphone 14 converts input sounds into electrical signals that are digitized by A/D converter 16 and stored in memory 12 under control of processor 10. Stored data representing sounds are converted to analog signals by D/A converter 20 and output as sounds by speaker 18. The system of FIG. 1 may be implemented using a conventional personal computer (PC) having a sound card coupled to a microphone and speaker. Visual information is output to a user by a visual display 22, such as a CRT or LCD display. Preferably the system has a graphical user interface whereby control information to navigate the system is input from a user by a GUI input device 24 such as mouse, trackball or the like; but because aphasic patients may have difficulty operating such devices it is particularly preferred that input device 24 comprises a touch screen overlying visual display 22. The system hardware in FIG. 1 is generally conventional and may be embodied by a PC; software stored in memory 12 operates the system to provide a spoken message generating system in accordance with the present invention. In this regard, it is believed systems operating as described herein can be implemented by those of ordinary skill in the art without undue experimantation.

Figure 2:
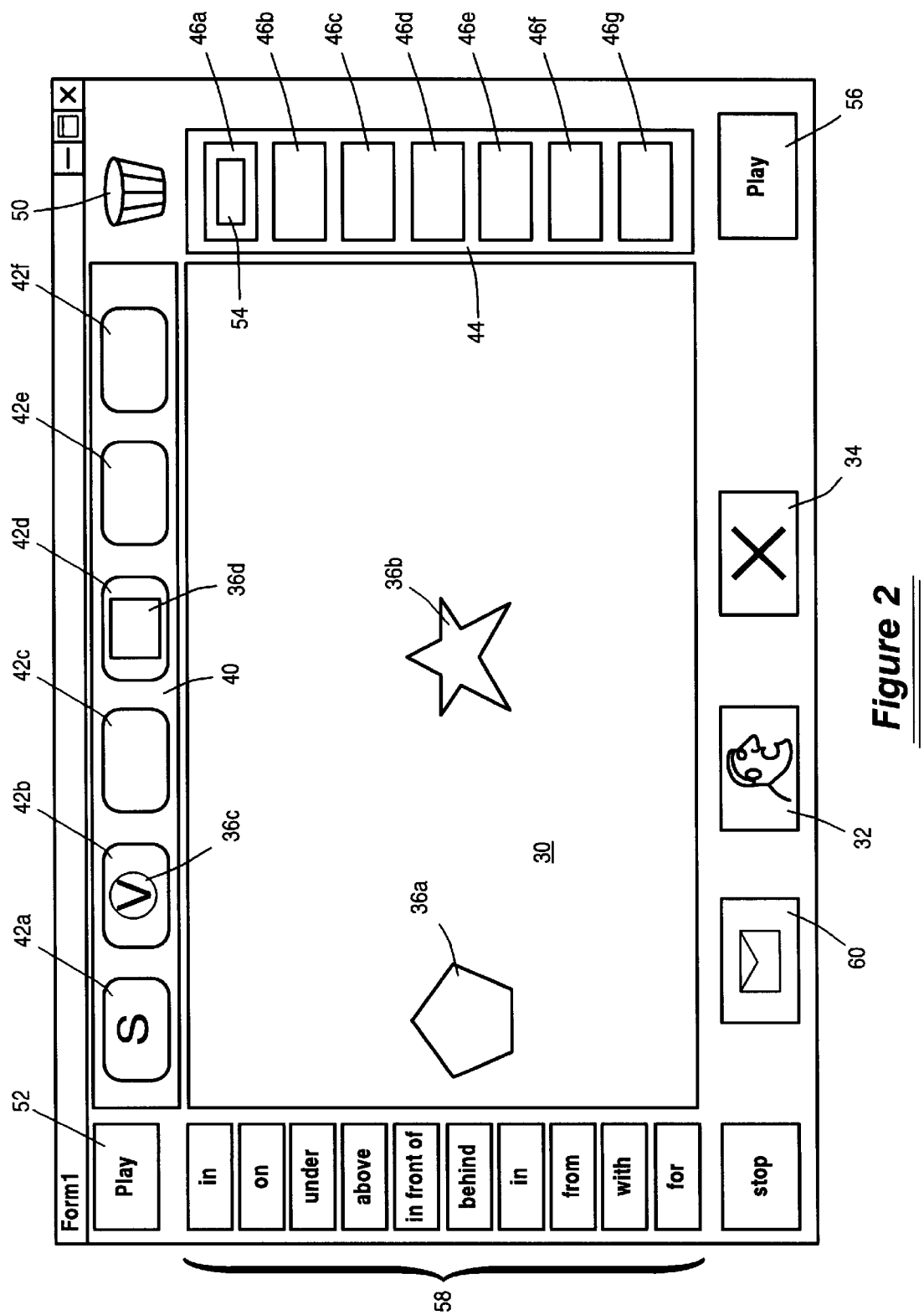
FIG. 2 is an illustration of a visual display that may be generated by a spoken message generating system in accordance with the present invention.

FIG. 2 is an illustration of a visual display that may be generated by a system according to the present invention as part of a graphical user interface for use in synthesizing spoken message. Applicants generated the interface depicted in FIG. 2 using the Visual Basic language to store and manipulate Microsoft Windows sound (wav) files. The interface includes an input workspace area 30 that is initially blank. The interface also includes a pair of sound recording control buttons 32, 34. Actuating recording start button 32 starts the recording of sound data as a sound file; recording is stopped and the sound file is closed when recording stop button 34 is actuated. When a sound file is created, the system associates an icon with the file and displays the icon in the input workspace area 30. To distinguish them from other icons generated by the system, such icons associated with sound files will be referred to as "sound icons". Because the meaning of the recorded input sound will generally be unknown, the sound icon associated with it will be arbitrary. Thus the system may be provided with a set of icons available to be associated with recorded sound files, the icons being arbitrary but easily identified and distinguished from each other. Applicants have found different shape geometric figures of differing color to be suitable sound icons; for instance, the system that generated the display illustrated in FIG. 2 uses an orange circle, a yellow triangle, a red square, a green pentagon, a blue octagon, and a purple star.

FIG. 2 shows several icons 36 that are associated with sound files. As each new sound file is created, its sound icon is displayed in input workspace area 30 and remains there until it is moved by dragging it across the display. Touching a sound icon causes the recorded sound it represents to be played back. Thus, for example, a user can record a word, touch its sound icon 36 to play it back, if unacceptable move the sound icon 36 to trash can icon 50 for deletion, and repeat the process until an acceptable recording has been made. Preferably touching the sound icon provides visual feedback to help the user associate the icon with the recorded sound; for instance, the icon may be reduced in size as the associated sound file is played. Input workspace area 30 may contain a number of sound icons, and they may be accumulated there during the course of constructing a speech message. FIG. 2 shows two sound icons 36*a*, 36*b* in the input workspace area 30. The sound represented by each sound icon is a speech element that may be used to construct a speech message. A speech message is constructed by placing the sound icons representing its constituent elements in an assembly area in the appropriate order to form the message. Desirably, and as shown in FIG. 2, several such assembly areas are provided. Area 40 contains six icons 42*a*, 42*b*, . . . 42*f*, each of which can receive and contain a sound icon 36. FIG. 2 shows two sound icons 36*c*, 36*d* that have been placed in the area 40. Area 40 is used to concatenate a plurality of separately recorded speech elements such as words or phrases into a larger speech construct such as a phrase or sentence. Concatenated speech elements assembled in area 40 may be treated as a group, associated with and represented by an icon, and moved to assembly area 44 to assemble still larger speech constructs. Thus, a user can separately record the words of a sentence, assemble the words into a sentence in area 40, move the sentence into area 44 to start a paragraph, and then record more words in area 30 and assemble them in area 40 to form further sentences of the paragraph. Thus, for convenience, assembly area 40 may be referred to as the sentence assembly area and its icons 42 as word holding icons, and assembly area 44 may be referred to as the paragraph assembly area 44 and its icons 46 as sentence holding icons, it being understood that the speech elements these areas may contain are not in fact so limited. Applicants have found a set of six different sound icons 36 available to be associated with recorded speech elements icons and a set of six word holding icons 42 available to receive them to be adequate to generate sentences for ordinary communication, and seven sentence holding icons 46 to be adequate to generate paragraphs for ordinary communication, although greater or lesser numbers might also be used.

FIG. 2 shows the display as it might appear during the course of constructing a speech message, and will be described in connection with the operation of the system through the illustrated interface. For instance, the user may be attempting to construct the sentence "I want a drink of water." The user may have recorded the phrase "I want" and dragged the sound icon 36*c* representing it to word holding icon 42*b*, and recorded the word "glass" and dragged the sound icon 36*d* representing it to word holding icon 42*d*. The user may have recorded the words "a" and "of water" represented by the sound icons 36*a* and 36*b* still in the input workspace area 30. The user might continue the speech message construction process by touching the sound icon 36*a* to play it and verify the associated sound, dragging it to word holding icon 42*c*, touching the sound icon 36*b* to play it and verify the associated sound, and dragging it to word holding icon 42*e*. Touching play button 52 causes the system to play the sound files associated with all of the sound icons in assembly area 40 in order from left to right, i.e. from 42*a* through 42*f*. Preferably blank word holding icons 42 not containing a sound icon 36 are ignored, so only the relative order of any sound icons 36 that are present will matter, and their absolute position will not. So configured, when play button 52 is touched, the system would generate an audio output speaking the words represented by sound icons 36*c*, 36*d*: "I want . . . glass". Having thus refreshed his or her recollection as to the status of the sentence being constructed, the user might touch sound icons 36*a* and 36*b* in the input workspace area 30 to play their sounds and move them into word holding icons 42*c* and 42*f*, respectively, to complete the sentence "I want a glass of water" that can be reviewed by touching sentence play button 52. If the user desires, changes can be made to the assembled sentence. For instance, if "I want a glass of water" seems upon reflection to be too demanding, the user could touch sound icon 36*c* and drag it back to input workspace area 30 or to trash can icon 50 to remove the speech element "I want" from the sentence under construction, record a new speech element "Please get me", and move its sound icon to one of the word holding icons 42*a* or 42*b* to place it in the appropriate order in the sentence. If the resulting sentence is acceptable to the user, it can be saved and treated as a unit. In the preferred system as illustrated, this is effected by touching sentence assembly area 40 outside the boundaries of the sound icons 36; this causes a rectangular icon to appear, which represents the ordered group of speech elements represented by the sound icons 36 present in sentence assembly area 40, which rectangular icon can then be dragged to one of the sentence holding icons 46 in paragraph assembly area 44. This process causes the sentence assembly area 40 to be cleared, ready for assembly of another sentence. FIG. 2 shows a sentence-representing sound icon 54 in sentence holding icon 46a. As with the sentence assembly area 40, sentence-representing sound icons 54 can be moved among and removed from sentence holding icons 46 in the process of constructing a paragraph, and the current status of the paragraph being assembled can be reviewed by touching paragraph play button 56. The system may be provided with icons representing high frequency or difficult words that aphasics may often need. Thus icons 58 represent frequently used prepositions or prepositional phrases. A similar set of icons might be provided for commonly used or difficult-to-iconize verbs such as go, make, give, take, want, have, put, do, is, and say. When touched, such icons 58 may play pre-recorded sounds to assist the user in recording the words in his or her own voice; provision may also be made to associate a user-generated sound file with the icons. If a communication interface 26 such as a modem or network interface is provided to a communication channel 28, as shown in FIG. 1, with appropriate communication software in memory 12, the sentences or paragraphs constructed using the system can be e-mailed, and an icon 60 as shown in FIG. 2 may be provided to bring up an e-mail interface on the display. Such an e-mail interface may include an address list made up of the names and/or pictures of the user's correspondents, whereby touching the recipient's name or picture would cause the sound file to be e-mailed to the recipient. The system may be provided with speech recognition capabilities, such as by software stored in memory 12; a speech recognizer enables the system to convert the speech messages created using the system into text files. These text files can be stored or emailed. The system may further be provided with natural language understanding capabilities, again by software stored in memory 12. Such a natural language understanding engine may receive the text output from the speech recognizer, check it for grammaticality, and provide suggestions as to missing or incorrect elements of the speech message.

Figure 3:
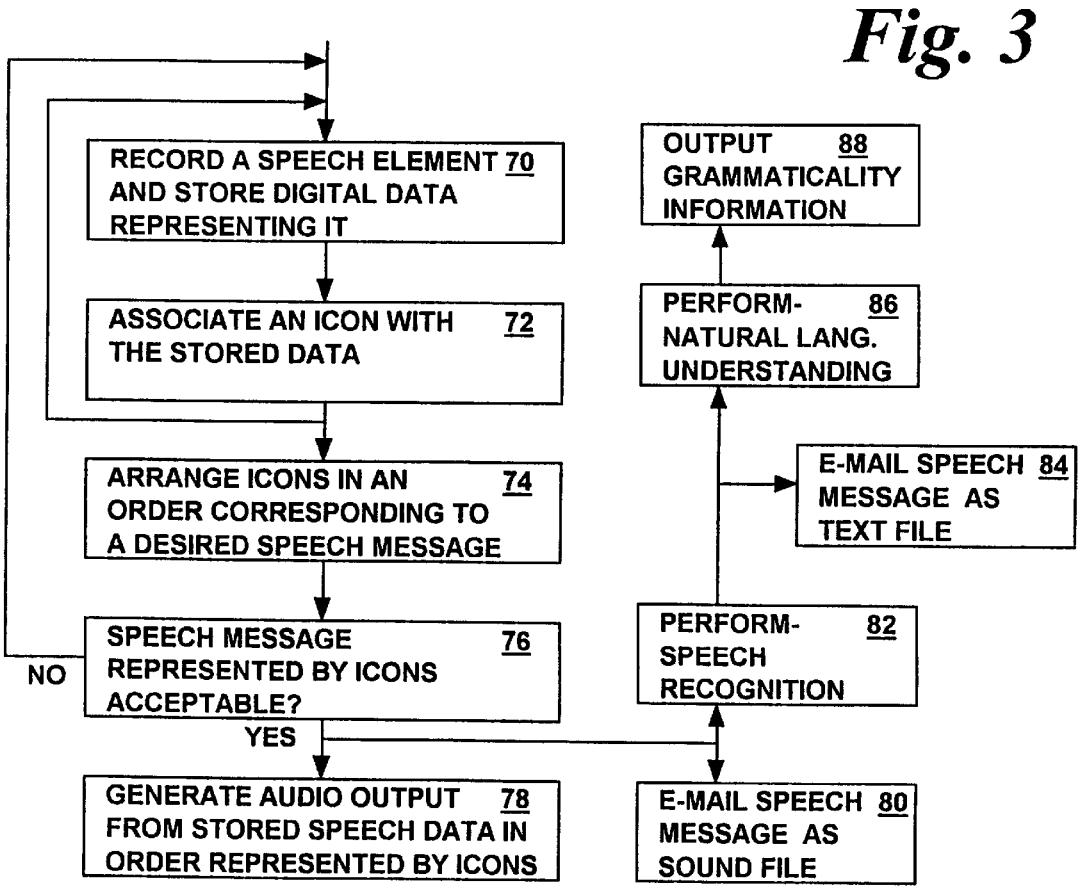
FIG. 3 is a flow diagram illustrating the operation of a spoken message generating system in accordance with the present invention.

Thus the general operation of the system of the present invention is illustrated in FIG. 3. In step 70, audio speech signals are recorded during a time interval and stored as digital data; this data represents an element of speech such as a word or phrase that can be assembled with other such elements into a speech message. In step 72, an icon is associated with the stored data representing the speech element. As indicated by the dotted line, steps 70 and 72 may be repeated to provide sufficient speech elements to create a speech message. In step 74, the icons are arranged to indicate the order of the speech elements they represent in the message being created. If the speech message represented by the ordered icons is not acceptable, as determined in step 76, further speech element recording and icon arranging steps can be performed. Once the speech message represented by the ordered icons is acceptable, it can be communicated. It is expected that the principal mode of communicating the speech messages generated using the system will be as audible sound, and in step 78 an audio output is generated from the stored speech data in the order represented by the arrangement of the icons. Alternatively or in addition to the audio output, in step 80 the ordered speech element data is transmitted as a sound file in an e-mail message. Optionally in step 82 speech recognition is performed on the ordered speech data to generate a text file representing the speech message. The resulting text file may be transmitted as an e-mail message in step 84. Natural language understanding may be performed on the text file in step 86, and in step 88 the system may output information to the user as to the grammaticality of the speech message to assist the user in crafting the speech message.

The system of the present invention provides a means for communicating that is well adapted to the characteristics of aphasic patients. An aphasic patient might be able to think of and vocalize small component speech elements of an intended sentence, but such a user might have difficulty maintaining the entire sentence in mind during its construction. The ability throughout the process to record and play the individual speech elements, and the phrase or sentence being constructed from them, enables an aphasic patient to retain the previously, frequently laboriously completed work and helps guide the further composition efforts toward their completion. This is especially helpful since aphasics may be able to judge the grammaticality of their speech much better when they are playing it back than when they are initially composing it. The system of the invention enables an aphasic patient to construct a message that can be rendered in the patient's own voice. It does not restrict the user to pre-selected, previously stored words as message elements; the user can create and manipulate any desired segments of a message, using words or phrases of the user's own choosing. Accordingly, the system of the invention is easy to use because it does not require the user to search through some organizational system to attempt to locate words that may have been previously stored. In addition to aiding an aphasic patient in composing useful messages, the system of the invention also may help improve a patient's speech capabilities since it exercises the patient in word finding, vocalization, and grammaticality judgment.

Variations on the systems disclosed herein and implementation of specific systems may no doubt be done by those skilled in the art without departing from the spirit and scope of the present invention.

What is claimed is:

1. A computer-implemented method for enabling a patient to generate a speech message, the method comprising the steps of:

recording a plurality of digital data files, wherein the step of recording is performed by the patient, and each one of the digital data files representing a respective speech segment spoken by the patient during a respective time interval;

associating a different icon with each one of the digital data files;

arranging the icons in an order representing the speech message composed of the respective speech segments; and generating an audible speech message from the digital data files in the order represented by the icons.

2. The method of claim 1, further comprising the step of e-mailing the digital data files representing the speech message.

3. The method of claim 1, further comprising the step of performing speech recognition on the digital data files representing the speech message to provide text files representing the speech message.

4. The method of claim 3, further comprising the step of performing natural language processing on the text files representing the speech message to determine the grammaticality of the speech message.

5. The method of claim 1, wherein the step of associating includes associating a different arbitrary icon with each one of the digital data files.

6. The method of claim 1, further comprising the step of evaluating a selected one of the digital data files, and further comprising the step of re-recording the selected digital data file based on a result of the evaluating step.

7. A computer-implemented method of enabling a speech-impaired patient to synthesize a speech message, the method comprising the steps of:
- recording at least first and second speech elements spoken by the patient, wherein the step of recording is performed by the patient;
- digitizing the first and second speech elements to provide respective first and second digital representations corresponding to the first and second speech elements;
- storing the first and second digital representations;
- associating first and second icons respectively with the first and second digital representations;
- arranging the first and second icons to form the speech message; and
- generating an audio output by playing the first and second digital representations.

8. The method of claim 7, wherein the step of associating includes associating a different arbitrary icon with each one of the digital representations.

9. The method of claim 7, wherein the step of arranging includes placing the first and second icons into a sentence assembly area in an order, and wherein the step of generating includes playing the digital representations corresponding to the first and second icons.

10. The method of claim 7, wherein the step of generating an audio output includes playing the digital representations corresponding to the first and second icons placed in the sentence assembly area.

11. The method of claim 7, further comprising the steps of grouping the first and the second icons and placing the first and the second icons as a group into a paragraph assembly area.

12. The method of claim 11, wherein the step of generating an audio output includes playing the digital representation corresponding to the first and second icons placed in the paragraph assembly area.

13. The method of claim 7, further comprising the step of evaluating a selected one of the speech elements, and the step of re-recording the at least first and second speech elements spoken by the patient based on a result of the evaluating step.

14. The method of claim 7, further comprising the step of performing speech recognition on the audio output to produce a text output.

15. The method of claim 14, further comprising the step of performing natural language processing on the text output.

16. The method of claim 15, further comprising the step of performing grammaticality analysis on the text output.

17. The method of claim 14, further comprising the step of e-mailing the audio output.

18. A computer implemented interface enabling a patient to synthesize a speech message, the interface comprising:
- means for recording a plurality of speech segments spoken by the patient;
- means for associating each one of the speech segments with a respective sound icon that is responsive to patient input to output the speech segment associated with the icon;
- an input workspace area adapted to store the sound icons;
- a sentence assembly area including a plurality of word holding icons, each one of the word holding icons adapted to contain one of the sound icons, the sentence assembly area being responsive to patient input to group each one of the sound icons contained in the sentence assembly area into a sentence representing sound icon, thereby synthesizing at least a portion of the speech message;
- means, responsive to patient input, for playing a speech element associated with one each of the sound icons contained in the sentence assembly area;
- a paragraph assembly area including a plurality of sentence holding icons, each one of the sentence holding icons adapted to contain one of the sentence representing sound icons; and
- means, responsive to patient input, for playing the speech elements associated with each of the sentence representing sound icons contained in the sentence assembly area, thereby outputting at least a portion of the speech message to the patient.

19. The interface of claim 18, further comprising means for e-mailing at least a portion of the speech message.

* * * * *